United States Patent
Bellows

(10) Patent No.: US 8,870,069 B2
(45) Date of Patent: Oct. 28, 2014

(54) CO-LOCATED ANTENNA ARRANGEMENT

(75) Inventor: David E. Bellows, Wantagh, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 232 days.

(21) Appl. No.: 13/591,351

(22) Filed: Aug. 22, 2012

(65) Prior Publication Data

US 2014/0054378 A1     Feb. 27, 2014

(51) Int. Cl.
*G06K 7/00*     (2006.01)

(52) U.S. Cl.
USPC .......................................... 235/439; 235/375

(58) Field of Classification Search
CPC ....... H01Q 1/243; H01Q 9/265; H01Q 9/285; H04W 4/046; H04W 84/18; G06K 7/10722; H04N 5/2258; H04N 9/045
USPC ......... 235/438, 380, 375, 382, 492, 493, 486, 235/487, 439
See application file for complete search history.

(56) References Cited

U.S. PATENT DOCUMENTS

| | | | |
|---|---|---|---|
| 6,788,338 B1 * | 9/2004 | Dinev et al. ................ | 348/222.1 |
| 8,717,246 B2 * | 5/2014 | Lu et al. ........................ | 343/795 |
| 2001/0007335 A1 | 7/2001 | Tuttle et al. | |
| 2001/0040640 A1 | 11/2001 | Kim | |
| 2004/0080462 A1 | 4/2004 | Apostolos et al. | |
| 2004/0135734 A1 | 7/2004 | Uesaka et al. | |
| 2004/0212545 A1 | 10/2004 | Li et al. | |
| 2005/0052334 A1 | 3/2005 | Ogino et al. | |
| 2005/0088346 A1 | 4/2005 | Hwang et al. | |
| 2005/0143133 A1 | 6/2005 | Bridgelall | |
| 2005/0237244 A1 | 10/2005 | Annabi et al. | |
| 2005/0248488 A1 | 11/2005 | Modro | |
| 2006/0020300 A1 | 1/2006 | Nghiem et al. | |
| 2006/0250310 A1 | 11/2006 | Yeh et al. | |
| 2007/0001915 A1 | 1/2007 | Kono et al. | |
| 2007/0069957 A1 | 3/2007 | Ranta | |
| 2007/0103316 A1 | 5/2007 | Tuttle | |
| 2007/0132651 A1 * | 6/2007 | Nilsson ..................... | 343/781 P |
| 2007/0200766 A1 | 8/2007 | McKinzie, III et al. | |
| 2007/0236401 A1 | 10/2007 | Yeh et al. | |
| 2007/0290863 A1 | 12/2007 | Tuttle | |
| 2008/0079643 A1 | 4/2008 | Jordan | |
| 2008/0129510 A1 | 6/2008 | Tuttle | |

(Continued)

FOREIGN PATENT DOCUMENTS

| | | |
|---|---|---|
| EP | 2226895 A2 | 9/2010 |
| JP | S5763941 A | 4/1982 |
| KR | 100865750 B1 | 10/2008 |

OTHER PUBLICATIONS

International Search Report and Written Opinion for counterpart International Patent Application No. PCT/US2013/053242 mailed Oct. 30, 2013.

(Continued)

*Primary Examiner* — Thien M Le
(74) *Attorney, Agent, or Firm* — Brian M. Mancini

(57) ABSTRACT

An antenna method and arrangement of co-located antennas for wireless communication, includes at least one first antenna having a reflector panel and at least one second antenna utilizing a ground plane, wherein the reflector panel and the ground plane are the same element of the arrangement. The first antenna can be a loop element parallel to the reflector panel and the second antenna can be a monopole element perpendicular to the reflector panel/ground plane.

15 Claims, 7 Drawing Sheets

(56) References Cited

U.S. PATENT DOCUMENTS

| | | |
|---|---|---|
| 2008/0267151 A1 | 10/2008 | Hartenstein |
| 2009/0066586 A1 | 3/2009 | Rao et al. |
| 2009/0131129 A1 | 5/2009 | Yamazaki et al. |
| 2009/0160720 A1 | 6/2009 | Tsilioukas et al. |
| 2009/0231141 A1 | 9/2009 | Kuo et al. |
| 2009/0322633 A1 | 12/2009 | Yun et al. |
| 2010/0045547 A1 | 2/2010 | Kono et al. |
| 2010/0103064 A1 | 4/2010 | Yang et al. |
| 2010/0253587 A1 | 10/2010 | Lindenmeier et al. |
| 2010/0271264 A1 | 10/2010 | Li et al. |
| 2012/0169552 A1* | 7/2012 | Lee et al. ............. 343/727 |
| 2013/0229262 A1* | 9/2013 | Bellows ................ 340/10.1 |

OTHER PUBLICATIONS

"Dual-band omni directional antenna for wireless telecommunication system", XP002715110, Database WPI, Thomson Scientific, London, GB, AN 2009-E67650, 1 pg (English Abstract Only).

\* cited by examiner

CO-LOCATED ANTENNA ARRANGEMENT

FIELD OF THE DISCLOSURE

The present disclosure relates generally to antennas, and in particular an arrangement of co-located antennas for wireless communication.

BACKGROUND

The use of wireless communications is expanding. Although wireless communications are most commonly used in wide-area environments (e.g. cellular), the use of wireless communication is greatly expanding in local area environments, such as a retail environment, a factory environment, a warehouse environment, etc. In addition, such local area wireless communications can use a variety of different services, using different frequency bands and communication protocols, e.g. Bluetooth™, Wi-Fi™, RFID, etc.

In a commercial environment there may be several different wireless networks being used, each using their own network infrastructure. For example, in a Radio Frequency Identification (RFID) application, fixed RFID readers may be mounted overhead (e.g., ceiling mounted) in several positions and orientations throughout the environment, in order to read any RFID tag within the environment. Also, in an IEEE 802.11 wireless local area network (WLAN) application, fixed WLAN access points readers may be mounted overhead (e.g., ceiling mounted) in several positions throughout the environment, in order to communicate with any mobile or fixed device within the environment. An overhead configuration offers several advantages such as fewer physical obstructions, ease of access to wiring in a ceiling, tamper resistance, safety, and the like. Each of these applications can require multiple antennas and circuitry housings disposed throughout the environment. Therefore, it can be desirable to combine the network infrastructure of different systems into a common housing or into other available housings such as video cameras, locationing systems, etc. However, such combinations have disadvantages.

For example, combining different systems into a common housing will increase the size of the housing, making installation more difficult and appearing more obtrusive. In addition, one system can interfere with the operation of another system. For example, a video camera can block or jam signals of a WLAN or RFID antenna, resulting in a blind spot or coverage shadow in the environment for the WLAN or RFID infrastructure. In another example, a WLAN antenna can physically obstruct a video camera or a locationing system. In yet another example, when antennas of different systems (e.g. RFID and WLAN) are closely spaced, one system can detune or jam the other as the energy of one system undesirably couples to the other system. All of these examples can result in blind spots, coverage shadows, or poor performance for any or all of the systems.

Accordingly, there is a need for a method and an arrangement of a combination of different network infrastructure that overcome the aforementioned limitations.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
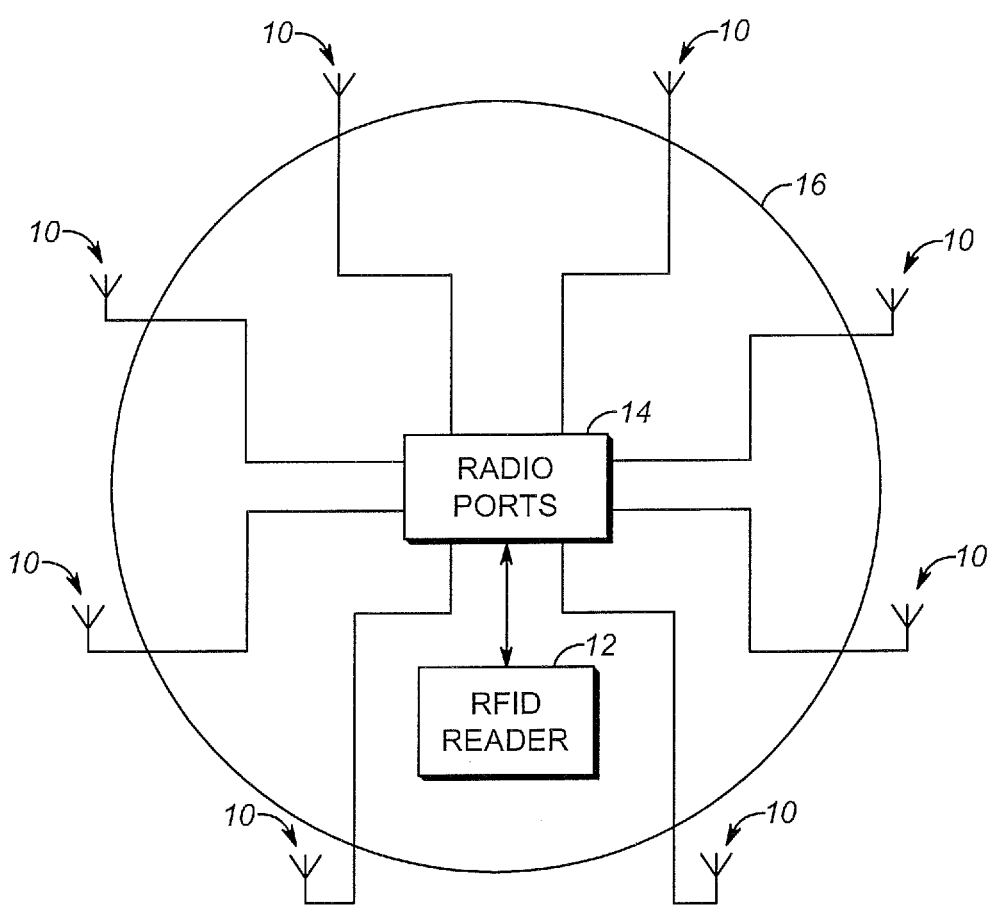
FIG. 1 is a simplified block diagram of an RFID reader and antenna configuration, in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In various exemplary embodiments, the present invention provides a technique for combining different network infrastructure into a common housing without significantly blocking or jamming signals of either system, i.e. without resulting in a significant blind spot or coverage shadow in the environment. The present invention also provides an overhead combination of infrastructure in a small and lightweight arrangement, where the physical size of the combination arrangement is kept to a minimum so that the system is unobtrusive, easy to install, integrate, and maintain, and can allow for other features, such as a security camera, locationing system, etc.

Although the present invention is described herein in terms of combining UHF RFID and WLAN architectures (IEEE 802.11 and variants thereof), it should be recognized that the present invention can be applied to the combination of any one or more of other wireless technologies such as, but are not limited to: RF; IrDA (infrared); Bluetooth; ZigBee (and other variants of the IEEE 802.15 protocol); IEEE 802.11 (any variation); other RFID frequency bands, such as HF and LF; IEEE 802.16 (WiMAX or any other variation); Universal Mobile Telecommunications System (UMTS); Code Division Multiple Access (CDMA) including all variants; Global System for Mobile Communications (GSM) and all variants; Time division multiple access (TDMA) and all variants; Direct Sequence Spread Spectrum; Frequency Hopping Spread Spectrum; wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB.

In general, the RFID reader is configured to provide communication between the RFID reader and RFID tags. For example, the RFID reader "interrogates" RFID tags, and receives signals back from the tags in response to the interrogation. The reader is sometimes termed as "reader interrogator" or simply "interrogator". In an exemplary embodiment, the RFID reader may include, without limitation one or more of: a processor, a communication module, memory, and at least one antenna. The elements of the RFID reader may be interconnected together using a communication bus or another suitable interconnection arrangement that facilitates communication between the various elements of the RFID reader. The WLAN access point is configured to provide communication between a wireless switch and mobile devices. For example, the wireless switch can connect a call from the mobile device to a wired Ethernet connection to other entities on the Internet. In an exemplary embodiment, the WLAN access point may also include, without limitation one or more of: a processor, a communication module, memory, and at least one antenna. The elements of the WLAN access point may be interconnected together using a communication bus or another suitable interconnection arrangement that facilitates communication between the various elements of the WLAN access point.

The communication module of the RFID reader includes components enabling the RFID reader to communicate on a wired or wireless network. For example, the communication module may include a wired Ethernet interface to communicate information about RFID tags on a local area network to a central server. Alternatively, the RFID reader can be connected to and use the co-located WLAN access point to communicate information about RFID tags wirelessly to a central server. It should be appreciated that the description herein portrays the RFID reader and WLAN access point in an oversimplified manner, and a practical embodiment can include additional components and suitably configured processing logic to support known or conventional operating features that are not described in detail herein for the sake of brevity.

A processor may be any microprocessor, application specific integrated circuit, field programmable gate array, digital signal processor, any suitable programmable logic device, discrete gate or transistor logic, discrete hardware components, or combinations thereof that has the computing power capable of managing the RFID reader or WLAN access point. The processor generally provides the software, firmware, processing logic, and/or other components of the RFID reader or WLAN access point that enable their functionality.

A memory can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory can incorporate electronic, magnetic, optical, and/or other types of storage media. Note that the memory can have a distributed architecture, where various components are situated remotely from one another, but can be accessed by the processor. The memory may be utilized to store data associated with RFID interrogations, WLAN addressing, a video camera, etc. For example, the camera can be used for capturing and storing video, audio, photographs, etc.

A housing combining different network infrastructure can further include electronics and RF components for operation of the antenna arrangement. The electronics, components, etc. of the combined network infrastructure may be disposed or located within the housing. For example, the housing may enclose electronics and the like for operation of the RFID reader, WLAN access point, as well as other components as described herein. The housing can be defined by a common conductive enclosure that shields internal components from external electrical signals while providing insulated feedthroughs or vias to provide communication signals outside of the housing, such as to antenna elements or wired connections. For example, the electronics and components may include electrical connectivity to the antenna feeds through the housing for transmission and reception of radio frequency signals. Alternatively, the housing need not be a common conductive enclosure, but can simply be an assembly of separate antennas mechanically connected together.

FIG. 1 illustrates a block diagram of an antenna configuration of one embodiment of the present invention. An RFID reader 12 can be connected to a plurality of antenna elements 10 via an antenna switch or different radio ports 14 of the RFID reader. Also, the RFID reader can direct the different radio ports to sequentially communicatively connect only one antenna element at a time to the RFID reader such that only one antenna element is operable to transmit/receive at any instant in time. The RFID reader can provide any received tag information it obtains to an access point that can be wired or wirelessly connected to a local area network (not shown) for inventory purposes, for example. Although eight antenna elements are shown, there could be any number of elements. Preferably, there is an even number of antenna elements arranged in a circle to radiate outwardly from the circle. As shown in this embodiment, there are eight antenna elements evenly disposed at 45 degree intervals of the circle and connected to an eight-port radio.

Figure 2:
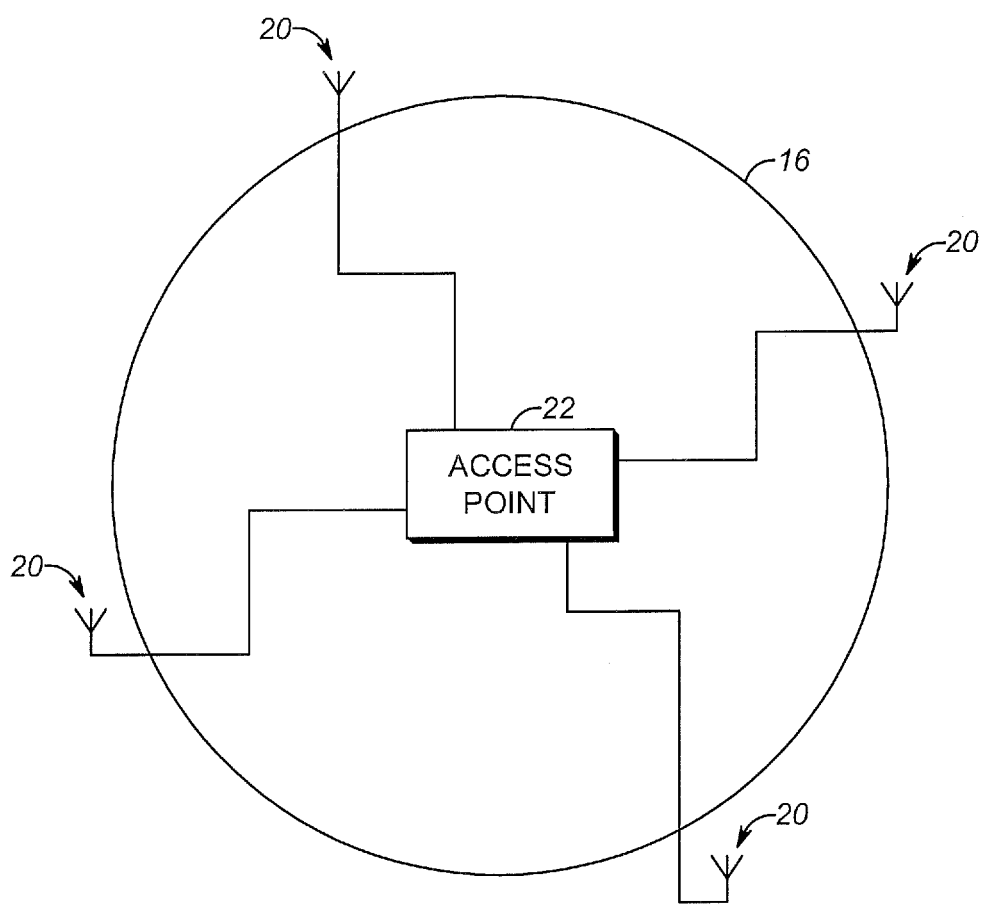
FIG. 2 is a simplified block diagram of a WLAN access point and antenna configuration, in accordance with some embodiments of the present invention.

FIG. 2 shows a block diagram of another embodiment of the present invention including an antenna configuration of a WLAN access point 22 and associated antennas 20. The WLAN access point 22 can be integrated with the RFID reader 12 of FIG. 1. The WLAN antennas can be connected to the access point in several different ways. In one embodiment, the four WLAN antennas can be connected to the access point in a dual Multiple-Input Multiple-Output (MIMO) configuration. Alternatively, the four antennas could be connected as a 2×2 MIMO, or they could simply be connected as two primary antennas (one at 2.4 GHz and one at 5 GHz) and two diversity (or secondary) antennas. Although the embodiment described herein has eight RFID antennas (of FIG. 1) and four WLAN antennas (of FIG. 2) with a WLAN antenna co-located with every other RFID antenna (as will be described below), the actual number of each of the RFID and WLAN antennas can be different, depending on the need, application, or coverage. For example, there can be one WLAN antenna co-located with every RFID antenna, e.g. eight of each.

Figure 3:
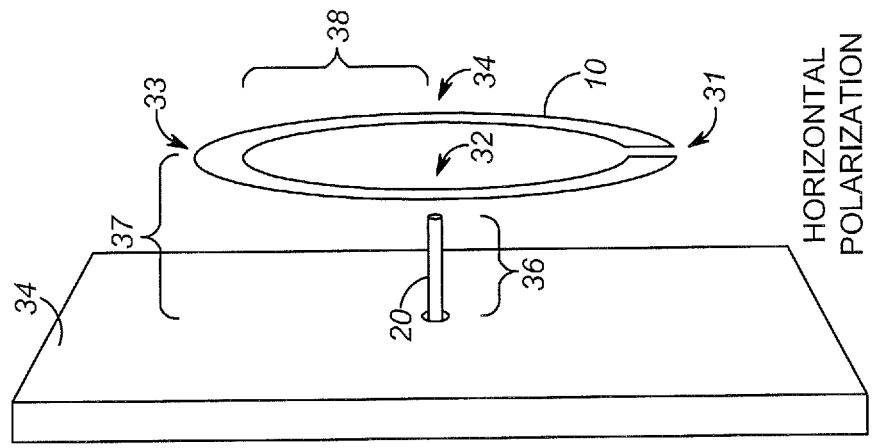
FIG. 3 is a perspective view of different arrangements of co-located antenna combinations for the network infrastructure of FIGS. 1 and 2.
Figure 3:
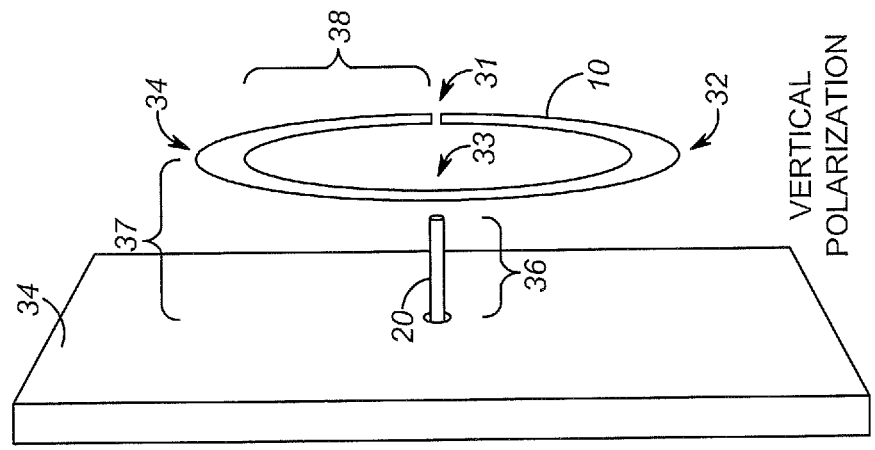

Referring to FIG. 3, in one embodiment, the RFID antenna 10 includes a linearly polarized, full wavelength loop as the driven element that is oriented substantially parallel (i.e. opposing positions on the loop are equidistant from the reflector panel) to a conductive reflector panel 34, wherein the loop element is fed by an RF signal at a specific feed point 31, depending on the linear polarization desired. For simplicity, a parallel arrangement is desired, but alternate embodiments can include a loop element that is not perfectly parallel to the reflector but within ±45 degrees. Optionally, a conductive circular director plate (not shown) can be included in the configuration that is also parallel with the loop, and having the loop oriented between the reflector panel and director plate. Those skilled in the art will recognize that the loop geometry can be different than what is shown in this exemplary embodiment—as examples, the size can be larger or smaller, the shape does not have to be a circle, the width of the loop does not need to be constant, etc. The director plate geometry may also vary, including but not limited to cutouts in the overall shape. Variations of the reflector panel geometry are also acceptable, including but not limited to changes in shape, size, curvature, etc. Also, the reflector panel may have holes cut out to provide electrical connections therethrough. Furthermore, the geometric details of the loop and reflector panel may be different for differing antenna polarizations. It should also be recognized that a partial circle antenna configuration can be used successfully in the present invention, other than the full circle embodiment shown, to provide a substantially linear polarization. Typically, the physical shape, size, and configuration of the antenna geometry should be resonant at 915 MHz, which is a standard frequency for RFID applications. For European RFID applications, the physical shape, size, and configuration of the antenna geometry should be resonant at 865 MHz.

In accordance with the present invention, the RFID antennas are linearly polarized to provide either of two orthogonal polarizations, i.e. polarized ninety degrees to each other. In particular, half of the antennas (10 of FIG. 1) have a first (e.g. vertical) polarization and half have a second (e.g. horizontal) polarization. The feed point 31 (or opposite point 33) of the first polarization could be anywhere along the loop element as long as the feed point 31 (or opposite point 33) of the second polarization is located ninety degrees from the feed point of the first polarization. In accordance with the present invention, the vertically and horizontally polarized antenna elements are positioned around an RFID reader in a circular arrangement (as shown in FIG. 1) wherein the antenna elements alternate polarizations around the circle 16, e.g. a vertically polarized antenna element has two neighboring horizontally polarized antenna elements, and vice versa.

In the examples shown in FIG. 3, the loop element 10 has a spacing 37 of about two inches from the reflector panel 34, for a 915 MHz system, which is a standard frequency for RFID applications. It should be noted that the spacing 37 does not necessarily need to be the same for both antenna polarizations. The reflector panel is approximately six inches tall, being either square, rectangular, trapezoidal, or a conic section, while the loop element is flat and approximately four inches in diameter. Note that there are other combinations of spacing 37, loop element diameter, and reflector panel size that result in a properly tuned and matched 915 MHz system. Also, the loop element does not have to be flat. For example, it may be contoured to follow the curved shape of a conical reflector. In addition, although a circularly polarized antenna could be used, circularly polarized antennas need an additional 3 dB of circular gain to match the gain of their linear equivalents of FIG. 3, which would result in a significantly larger antenna arrangement and housing. Therefore, the solution of providing the physically smaller alternating linearly polarized antenna elements of the present invention results in a truly integrated solution that is simpler, smaller, and lighter than is available in the prior art.

It should be noted that the size values are approximate, and they could all be varied to affect a different antenna gain, frequency match, or radiation pattern. The use of a reflector panel placed behind the loop element and having a spacing therebetween helps to reflect back most of the RF energy, making the antenna element a high gain antenna system. The reflector panel takes energy that is directed backwards towards it from the loop element and redirects it, combining it with the directly radiated pattern that was already directed forward. The result is a high gain, directional antenna. One antenna embodiment has a gain of 6 dB with a 3 dB (half power) beamwidth ranging from 72 degrees to 93 degrees.

The antenna arrangement 30 of FIG. 3 also includes a WLAN monopole antenna 20 operable on an IEEE 802.11 frequency band, such 2.4 or 5GHz, or both. Although shown as a monopole, it is envisioned that the WLAN antenna can be configured as a tilted whip antenna, an inverted F-antenna, or a patch antenna, all of which require a ground plane. The WLAN monopole antenna is oriented substantially perpendicular to the reflector panel and the loop element along an axis substantially central to the loop element. The loop and monopole antennas are positioned apart 38 more than one-quarter wavelength of the antenna having the higher operating frequency, e.g. one-quarter wavelength of the operating frequency of the monopole antenna (2.4 GHz or 5 GHz). As is known in the art, a monopole antenna utilizes a ground plane. However, a novel aspect of the present invention is using the reflector panel of the RFID loop antenna as a ground plane for the WLAN antenna, i.e. they are the same element of the antenna arrangement 30. In this way, the present invention provides the advantage that the RFID loop antenna and WLAN monopole antenna can be co-located without taking up any more spatial volume of an enclosure of the housing, which frees up critical spatial volume for other features, such as a video camera and a locationing system.

In practice, the monopole is a thin, narrow metal strip (up to approximately 0.5 inches wide) or a wire that is one-quarter wavelength long 36 in the operational WLAN frequency band. For the 2.4 GHz WLAN frequency band, one-quarter wavelength is approximately 1.2 inches, and for the 5 GHz WLAN frequency band, one-quarter wavelength is approximately 0.5 inches. Referring to FIG. 3, where a loop element is fed at feed point 31, the high E-field locations on the loop are along each side (points 32 and 34) where at any instant in time, one side of the loop (e.g. 32) is positive and the other side is negative (e.g. 34), and the antenna has little to no E-field along the centerline (from points 31 to 33). Therefore, adding a small component, such as a monopole wire or strip, in the center of the loop does not affect the loop's performance. Accordingly, since the WLAN monopole antenna is positioned in the low E-field region of the loop, RFID functionality is not affected, which has been confirmed in actual physical tests. Conversely, the RFID loop antenna does not affect the WLAN monopole antenna performance since they are spaced apart 38 more than one-quarter wavelength of the operating frequency of the monopole antenna (2.4 GHz or 5 GHz), which also has been confirmed in actual physical tests. In other words, the distance 38 between the monopole and any portion of the loop element is greater than one-quarter wavelength of any WLAN frequency band, i.e. 0.5 or 1.2 inches, whereas the loop element has a radius of about 2.0 inches.

In the configuration shown in FIG. 3 the loop element 10 and reflector panel 34 can be spaced from each other using insulating spacers or standoffs therebetween (not shown) as are known in the art. However, it is envisioned that the loop element need not be mechanically coupled directly to the reflector panel, but instead can be mechanically coupled directly to the monopole element 20, which is mechanically coupled to the reflector panel 34, using insulating spacers or insulating standoff plates therebetween. Using the monopole element 20 as the mounting structure for the loop element 10 eliminates the need for a separate mounting structure, thereby reducing the number of parts, lowering cost, and simplifying the design.

Figure 4:
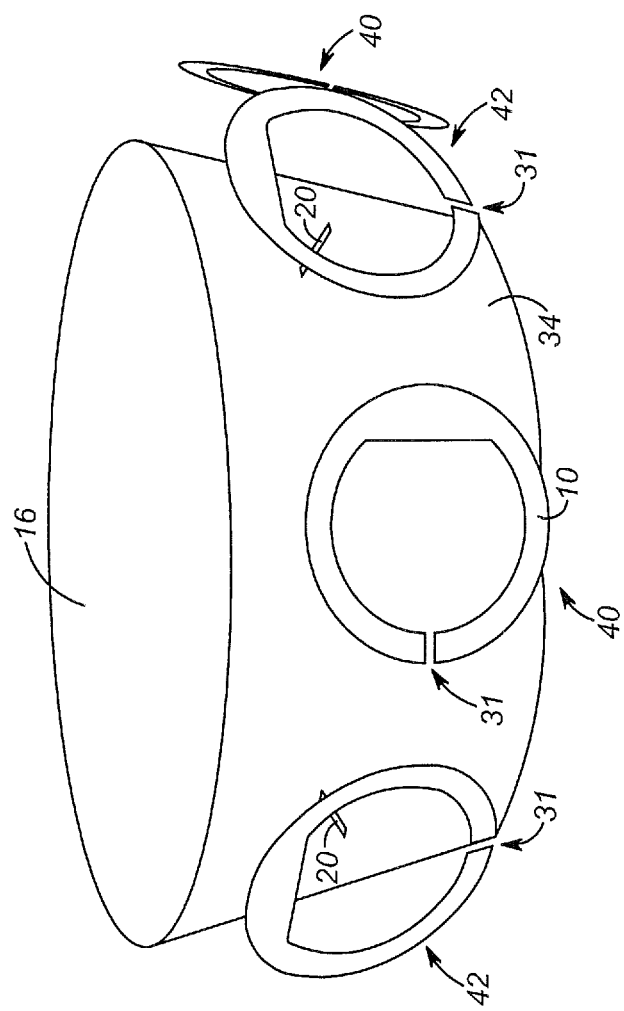
FIG. 4 is a perspective view of an embodiment of multiple antenna arrangements of FIG. 3.

FIG. 4 shows a perspective view of an eight element antenna configuration (only four of those shown in this example), in accordance with some embodiments of the present invention. This embodiment utilizes a plurality of the reflector-backed RFID linearly polarized loop antennas (such as those shown in FIG. 3) arranged in a circle (eight antennas spaced at 45 degree intervals) and alternating the polarization of each antenna to achieve 360 degrees of coverage. Some of the loop antennas include a co-located WLAN monopole antenna to form either of the antenna arrangements 30 of FIG. 3. In one embodiment, all (eight) antenna configurations include a WLAN monopole. In another embodiment, half of the antenna configurations include a WLAN monopole (as shown). It should be recognized that any number of WLAN and/or RFID antennas could be used.

All the reflector panels 34 can be electrically joined together to create a unified central conductive box or housing 16 that can be a continuous truncated conical surface that acts as one common reflector panel for all the antennas 10 and ground plane for all the antennas 20 as well as an electrical ground for the other electronics located inside the housing, shown in FIG. 4. Alternatively, the central housing 16 can have a faceted embodiment described by a trapezoidal pyramidal section with planar reflector panels. Alternatively, the reflector panels 34 are not electrically connected, but they still may be mechanically joined together to create a central housing. This alternate embodiment therefore results in a central housing composed of metallic sections close to each other but not touching. In this embodiment, the antenna arrangements 30 may be built as individual modules that are then mechanically assembled to a central housing or frame. The RFID loop antennas include alternating horizontally polarized antenna elements 42 and vertically polarized antenna elements 40 fed at a feedpoint 31 oriented ninety degrees from each other. The configuration shown results in an overall maximum dimension of about eighteen inches wide and about six inches tall with the housing portion 16 having a maximum dimension of about fourteen inches wide.

In the configuration shown in FIG. 4, numerous RF simulations were run and physical RF mockups of the system were built, and the testing validates the concepts associated with the antenna arrangement of the present invention. This configuration provides the ability to read all RFID tags in the environment while providing unobstructed WLAN communications in the environment. In fact, the RFID reader itself can be wirelessly controlled using the WLAN infrastructure of the invention.

Figure 5:
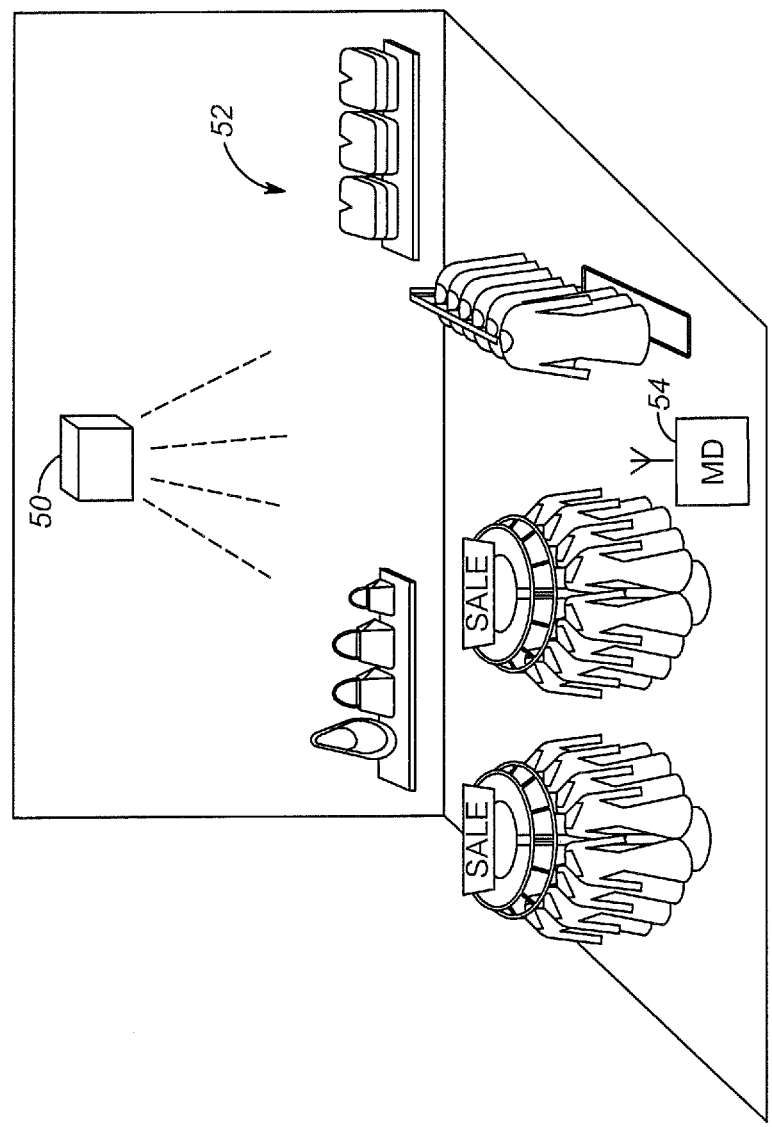
FIG. 5 is a perspective view of an example environment utilizing the antenna arrangement of FIG. 4.

FIG. 5 is a perspective diagram of an exemplary retail environment with an RFID reader/WLAN access point antenna housing enclosure 50 of the present invention in a ceiling-mounted overhead configuration. The present invention is configured to provide wireless interrogation of a plurality of RFID tags located on or affixed to a plurality of items 52, while also providing WLAN communication with mobile devices 54. The housing enclosure 50 may be mounted to a ceiling or other overhead fixture in the retail environment. The retail environment is shown solely for illustration purposes, and the antenna arrangement of the present invention may be used in any environment including a warehouse, manufacturing facility, file room, storage area, and the like.

The present invention includes a housing enclosing the wireless radios of the RFID reader and WLAN access point disposed therein and communicatively coupled to the antenna arrangement by providing RF feeds thereto. The housing can also include associated electronics for providing wireless communication functionality. The housing enclosure may further include a camera and a locationing system. The arrangement is configured to operate in an overhead configuration with respect to a plurality of RFID tags and mobile devices. The antennas of both network infrastructures are configured to provide a far field radiation pattern covering the floor of the environment.

Figure 6:
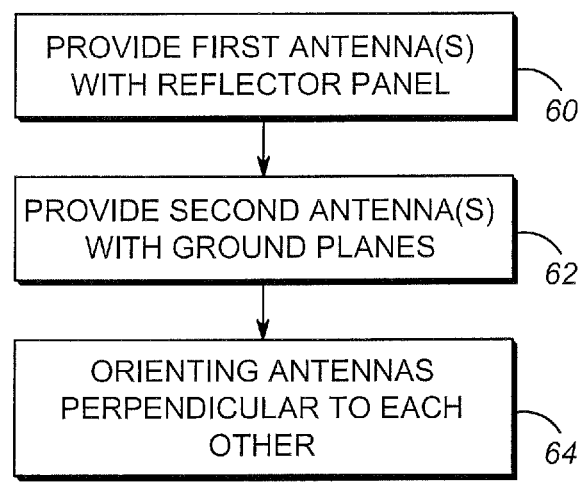
FIG. 6 shows a flowchart of a method in accordance with some embodiments of the present invention.

Referring to FIG. 6, the present invention describes a method for arranging co-located antennas for wireless communication of an RFID reader and IEEE 802.11 WLAN access point. A first step 60 includes providing at least one first antenna utilizing a reflector panel. In one embodiment, each first antenna comprises a linearly polarized, full wavelength loop element. In another embodiment, there is an even number of antenna elements arranged in a circle to radiate outwardly from the circle. In particular, there can be eight antennas evenly disposed at 45 degree intervals of the circle. Preferably, the antennas are linearly polarized to provide either of a vertical polarization and a horizontal polarization ninety degrees to the first polarization, and wherein the antennas alternate polarizations around the circle. In this configuration, each antenna provides an RFID read coverage area where the coverage areas of neighboring antennas may overlap. It can be that the reflector panels of the antennas are mechanically joined together and optionally electrically joined together to define a common reflector box, wherein the reflector box defines a housing that contains the RFID reader and acts as an electrical ground for electrical components in the box.

A next step 62 includes providing at least one second antenna utilizing a ground plane, wherein the reflector panel and the ground plane are the same element of the arrangement. In one embodiment, each second antenna comprises a monopole element. In another embodiment, there is an even number of second antennas arranged in a circle and being nested within every other first antenna. In particular, there can be four second antennas evenly disposed at 90 degree intervals of the circle. In this configuration, each antenna element provides access point coverage where areas of neighboring antenna elements may overlap. It can be that the reflector panels/ground planes of the antennas are mechanically joined together and optionally electrically joined together to define the common reflector box, wherein the reflector box defines a housing that contains the access point and acts as an electrical ground for electrical components in the box.

A next step 64 includes orienting the first antenna parallel to the reflector panel and the second antenna perpendicular to the reflector panel, where the first and second antennas are positioned apart more than one-quarter wavelength of the antenna having the higher operating frequency.

Figure 8:
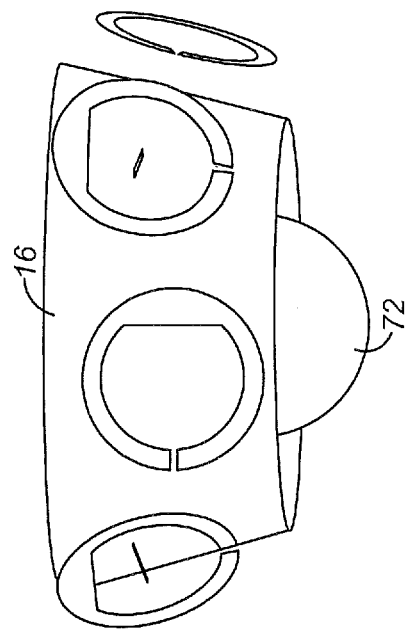
FIG. 8 shows a perspective view of an antenna arrangement in accordance with some embodiments of the present invention.
Figure 7:
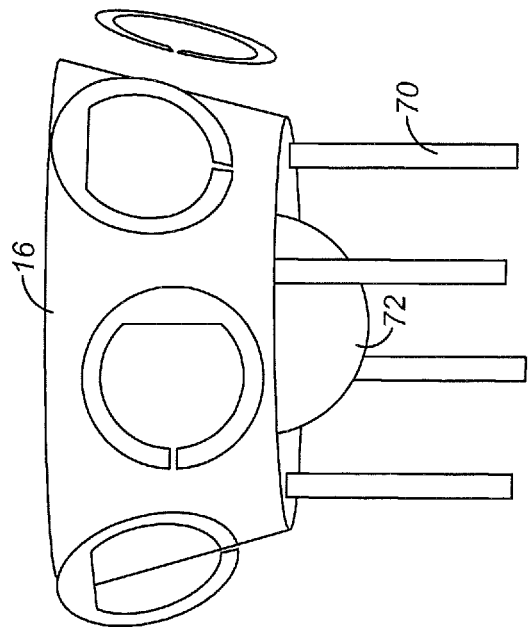
FIG. 7 shows a perspective view of a prior art antenna arrangement.

Referring to FIG. 7, a prior art antenna arrangement can include WLAN dipole antennas 70 mounted in separate regions from the RFID antennas, the dipole antennas being disposed below the RFID reader housing 16. This configuration of separate antenna elements doubles the size of the antenna arrangement. Also, where an optional locationing or camera system 72 is used, the dipole antennas can obstruct the operation of the locationing or camera system. In contrast, in the present invention, as shown in FIG. 8, the WLAN antennas are incorporated within the same space as the RFID reader system and antennas (as represented in FIG. 4). Moving the WLAN antennas away from the bottom surface of the housing frees up this critical area for other features, such as a camera and a locationing system, which are no longer obstructed by WLAN antenna elements.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An arrangement of co-located antennas for wireless communication, comprising:
    at least one first antenna having a reflector panel; and
    at least one second antenna utilizing a ground plane,
    wherein the first and second antennas are positioned apart more than one-quarter wavelength of the antenna having the higher operating frequency, and
    wherein the reflector panel and the ground plane are the same element of the arrangement.

2. The antenna arrangement of claim 1, wherein the first antenna is a linearly polarized, full wavelength loop element oriented substantially parallel to the reflector panel and the second antenna is a monopole antenna oriented substantially perpendicular to the reflector panel and the loop element, along an axis substantially central to the loop element of the first antenna.

3. The antenna arrangement of claim 1, further comprising a plurality of antenna arrangements, wherein the reflector panels of the antenna arrangements are mechanically joined together to define a common housing that contains radio circuitry for the first and second antennas.

4. The antenna arrangement of claim 1, further comprising a plurality of first antennas and antenna arrangements, wherein the reflector panels of the first antennas and the antenna arrangements are joined together to define a common reflector box, with each first antenna and each antenna arrangement positioned alternately around the reflector box, wherein the reflector box defines a housing that contains radio circuitry for the first and second antennas and acts as an electrical ground for the second antennas.

5. The antenna arrangement of claim 1, wherein the at least one second antenna is one of the group of: a tilted whip antenna, an inverted F-antenna, and a patch antenna.

6. An arrangement of co-located antennas for wireless communication, comprising:
    at least one first antenna having a reflector panel, wherein the at least one first antenna is a linearly polarized, full wavelength loop element oriented substantially parallel to the reflector panel; and
    at least one second antenna utilizing a ground plane,
    wherein the reflector panel and the ground plane are the same element of the arrangement.

7. The antenna arrangement of claim 6, wherein the first antenna is operable on a Radio Frequency Identification frequency band.

8. The antenna arrangement of claim 6, wherein the at least one second antenna is a monopole antenna oriented perpendicular to the reflector panel and the loop element, along an axis substantially central to the loop element of the at least one first antenna.

9. The antenna arrangement of claim 8, wherein the second antenna is operable on an IEEE 802.11 frequency band.

10. A plurality of co-located antenna arrangements, comprising:
   a plurality of first antennas each having a reflector panel; and
   a plurality of second antennas each utilizing a ground plane,
   wherein the reflector panels of the antenna arrangements are electrically joined together to define a common reflector box, wherein the reflector box defines a housing that contains radio circuitry for the plurality of first and second antennas and acts as an electrical ground for the plurality of second antennas.

11. An arrangement of co-located antennas for wireless communication, comprising:
   at least one first antenna having a reflector panel; and
   at least one second antenna utilizing a ground plane,
   wherein the reflector panel and the ground plane are the same element of the arrangement, and
   wherein the at least one second antenna is utilized as part of a mounting structure for the at least one first antenna.

12. An arrangement of co-located antennas for wireless communication, comprising:
   a conductive housing containing a Radio Frequency Identification reader switchably connectable to a plurality of radio ports disposed within the housing, and containing an IEEE 802.11 Wireless Local Area Network access point;
   a plurality of Radio Frequency Identification antennas disposed outside of the housing to use the housing as a reflector panel, and being coupled to provide communications to the Radio Frequency Identification reader via the radio ports, wherein the Radio Frequency Identification antennas comprise a plurality of linearly polarized, full wavelength loop elements oriented substantially parallel to the housing; and
   a plurality of IEEE 802.11 monopole antennas disposed outside of the housing to use the housing as a ground plane, and being coupled to provide radio communications to the access point, wherein the monopole antennas are oriented substantially perpendicular to the housing and are aligned along an axis substantially central to the loop element of the Radio Frequency Identification antennas.

13. The arrangement of claim 12, wherein a Wireless Local Area Network antenna is co-located with every other Radio Frequency Identification antenna.

14. A method for arranging co-located antennas for wireless communication, the method comprising the steps of:
   providing at least one first antenna having a reflector panel;
   providing at least one second antenna utilizing a ground plane; and
   orienting the first and second antennas to be positioned apart more than one-quarter wavelength of the antenna having the higher operating frequency,
   wherein the reflector panel and the ground plane are the same element of the arrangement.

15. The method of claim 14, wherein the step of orienting includes orienting the at least one first antenna substantially parallel to the reflector panel and the at least one second antenna perpendicular to the reflector panel.

* * * * *